US011978882B2

(12) United States Patent
Ishigaki et al.

(10) Patent No.: US 11,978,882 B2
(45) Date of Patent: May 7, 2024

(54) METHOD AND APPARATUS FOR MANUFACTURING ACTIVE MATERIAL MIXTURE

(71) Applicants: TOYOTA JIDOSHA KABUSHIKI KAISHA, Toyota (JP); NIHON SPINDLE MANUFACTURING CO., LTD., Amagasaki (JP)

(72) Inventors: Yuki Ishigaki, Nisshin (JP); Keiichiro Onishi, Osaka (JP); Keiichi Asami, Kyoto (JP)

(73) Assignees: TOYOTA JIDOSHA KABUSHIKI KAISHA, Toyota (JP); NIHON SPINDLE MANUFACTURING CO., LTD., Hyogo (JP)

( * ) Notice: Subject to any disclaimer, the term of this patent is extended or adjusted under 35 U.S.C. 154(b) by 655 days.

(21) Appl. No.: 17/265,904

(22) PCT Filed: Aug. 2, 2019

(86) PCT No.: PCT/JP2019/030577
§ 371 (c)(1),
(2) Date: Feb. 4, 2021

(87) PCT Pub. No.: WO2020/031914
PCT Pub. Date: Feb. 13, 2020

(65) Prior Publication Data
US 2021/0167355 A1 Jun. 3, 2021

(30) Foreign Application Priority Data
Aug. 6, 2018 (JP) .................... 2018-147810

(51) Int. Cl.
*H01M 4/36* (2006.01)
*H01M 4/04* (2006.01)
*H01M 10/0562* (2010.01)

(52) U.S. Cl.
CPC ......... *H01M 4/0416* (2013.01); *H01M 4/364* (2013.01); *H01M 10/0562* (2013.01)

(58) Field of Classification Search
CPC . H01M 4/0416; H01M 4/364; H01M 10/0562
See application file for complete search history.

(56) References Cited

U.S. PATENT DOCUMENTS

2015/0171414 A1* 6/2015 Takahata ............... H01M 4/621
429/212
2016/0013479 A1* 1/2016 Iwasaki ............... H01M 4/0402
429/305

(Continued)

FOREIGN PATENT DOCUMENTS

CN 107732142 A 2/2018
CN 107735887 A 2/2018

(Continued)

*Primary Examiner* — Olatunji A Godo
(74) *Attorney, Agent, or Firm* — Dickinson Wright, PLLC (57) ABSTRACT

Provided is a method for manufacturing an active material mixture, the method including: supplying and dispersing a solid electrolyte in a dispersion medium while circulating the dispersion medium (a first dispersion step); and thereafter supplying and dispersing an active material and a conductive material in the dispersion medium (a second dispersion step), wherein an average rotation speed of the rotor in the second dispersion step is lower than an average rotation speed of the rotor in the first dispersion step. Aggregation of the solid electrolyte can be suppressed by separately performing the first dispersion step and the second dispersion step, and the increase in temperature of the active material mixture can be reduced by lowering the rotation speed of the rotor in the second dispersion step.

6 Claims, 6 Drawing Sheets

(56) References Cited

U.S. PATENT DOCUMENTS

| | | | |
|---|---|---|---|
| 2016/0211504 A1 | 7/2016 | Uezono et al. | |
| 2017/0331110 A1 | 11/2017 | Ishiguchi | |
| 2018/0090748 A1 | 3/2018 | Mochizuki et al. | |
| 2018/0183047 A1* | 6/2018 | Sakamoto | C01G 53/50 |

FOREIGN PATENT DOCUMENTS

| | | | |
|---|---|---|---|
| EP | 2676724 | A1 | 12/2013 |
| EP | 3020469 | A2 | 5/2016 |
| JP | 2007216172 | A | 8/2007 |
| JP | 4458536 | B2 | 2/2010 |
| JP | 2013229176 | A | 11/2013 |
| JP | 2016149238 | A | 8/2016 |
| JP | 2017205705 | A | 11/2017 |
| JP | 2017220455 | A | 12/2017 |
| KR | 20160089278 | A | 7/2016 |
| WO | 2016194759 | A1 | 12/2016 |

* cited by examiner

METHOD AND APPARATUS FOR MANUFACTURING ACTIVE MATERIAL MIXTURE

RELATED APPLICATIONS

This Application is a National Stage Entry, under 35 U.S.C. § 371, of International Application No. PCT/JP2019/030577, filed on Aug. 2, 2019, which claims priority from JP Patent Application 2018-147810, filed Aug. 6, 2018, the disclosures of which are incorporated herein by reference in their entireties.

FIELD

The present application discloses a method and an apparatus for manufacturing active material mixtures.

BACKGROUND

Active material mixtures containing active materials, solid electrolytes, and conductive materials are known as cathode mixtures or anode mixtures for solid batteries. Such active material mixtures can be manufactured, for example, by mixing an active material, a solid electrolyte, a conductive material, and a dispersion medium with various kneaders as disclosed in Patent Literatures 1 and 2. On the other hand, as disclosed in Patent Literatures 3 and 4, powder mixing pumps are known that suck powders, feed liquids, and mix the powders and liquids while rotating a rotor provided with stirring blades in a casing.

CITATION LIST

Patent Literature

Patent Literature 1: JP 2017-220455 A
Patent Literature 2: JP 2017-205705 A
Patent Literature 3: JP 4458536 B
Patent Literature 4: JP 2007-216172 A

SUMMARY

Technical Problem

According to new findings of the present inventors, when mixing is performed to make an active material mixture while circulating a dispersion medium through a powder mixing pump as disclosed in Patent Literatures 3 and 4, the solid electrolyte in the mixture tends to aggregate, and it may be difficult to reduce the particle size of the mixture. When a large energy is applied to the mixture in order to suppress aggregation of the solid electrolyte, the temperature of the mixture is likely to increase largely.

Solution to Problem

As one of the means for solving the above problem, the present application discloses a method for manufacturing an active material mixture by mixing powders and liquids while rotating a rotor provided with stirring blades, the method including: a first dispersion step of applying and dispersing a solid electrolyte in a dispersion medium while circulating the dispersion medium; and a second dispersion step of, after the first dispersion step, supplying and dispersing an active material and a conductive material in the dispersion medium in which the solid electrolyte is dispersed, while circulating the dispersion medium, wherein an average rotation speed of the rotor in the second dispersion step is lower than an average rotational speed of the rotor in the first dispersion step.

In the method of the present disclosure, when the second dispersion step is divided into a first half and a second half, it is preferable that an average rotation speed of the rotor in the second half be lower than an average rotation speed of the rotor in the first half.

In the method of the present disclosure, when the second dispersion step is divided into the first half and the second half, it is preferable that an average supply rate of the active material and the conductive material in the second half be lower than an average supply rate of the active material and the conductive material in the first half.

In the method of the present disclosure, a powder mixing pump provided with the rotor, a powder supply device, a stirring tank having a stirring device, and a liquid feeding pump may be used.

Advantageous Effects

According to the new findings of the present inventors, in the case where mixing is performed to make an active material mixture while circulating a dispersion medium through a rotor provided with stirring blades as in the method of the present disclosure, aggregation of the solid electrolyte in the mixture can be suppressed and the particle size of the mixture can be reduced by dispersing the solid electrolyte in the dispersion medium and thereafter dispersing the active material and the conductive material in the dispersion medium.

According to the new findings of the present inventors, the slurry in the first dispersion step is low in solid content concentration and viscosity, and the temperature of the slurry is difficult to increase even if the rotation speed of the rotor is increased. On the other hand, when the active material and the conductive material are supplied in the slurry in the second dispersion step, the solid content concentration and viscosity of the slurry increase, and the slurry increases in temperature largely by friction/shear energy and the like when the rotation speed of the rotor is increased. In this regard, as in the method of the present disclosure, it is possible to reduce the increase in temperature of the active material mixture by lowering the rotation speed of the rotor in the second dispersion step.

According to the new findings of the present inventors, even if the rotation speed of the rotor in the second dispersion step is lowered, aggregation and the like of the solid electrolyte can be suppressed, and the particle size of the active material mixture finally obtained can be sufficiently reduced.

DESCRIPTION OF EMBODIMENTS

In the method for manufacturing an active material mixture of the present disclosure, mixing of powders and liquids is performed while rotating a rotor provided with stirring blades. For example, it is preferable to use a powder mixing pump that sucks powders, feeds liquids, and mixes of the powders and liquids while rotating the rotor provided with stirring blades in a casing. Hereinafter, preferred examples of the mixing apparatus (manufacturing apparatus) will be described.

1. Preferred Examples of Mixing Apparatus (Manufacturing Apparatus)

Figure 1:
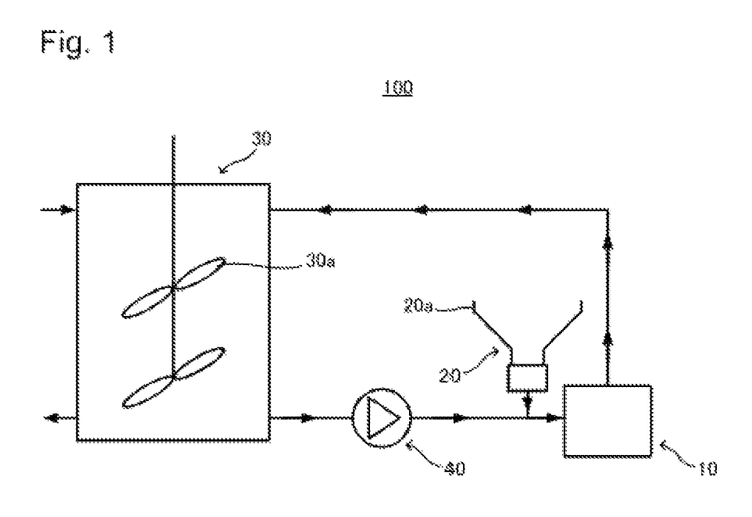
FIG. 1 is a schematic view to explain a structure of a mixing device 100.

FIG. 1 schematically shows a structure of an example (mixing apparatus 100) of a mixing apparatus (manufacturing apparatus) used in a method for manufacturing an active material mixture of the present disclosure. As shown in FIG. 1, the mixing apparatus 100 includes a powder mixing pump 10, a powder supply device 20, a stirring tank 30, and a liquid feeding pump 40. In the mixing apparatus 100, the powder mixing pump 10, the powder supply device 20, the stirring tank 30, and the liquid feeding pump 40 are connected, and fluids can be circulated through the powder mixing pump 10 and the like.

1. 1. Powder Mixing Pump 10

The powder mixing pump 10 is a pump that can suck powders, feed liquids, and mix the powders and liquids while rotating a rotor provided with stirring blades in a casing. For example, as disclosed in Patent Literatures 3 and 4, the powder mixing pump 10 may be "a pump in which rotors provided with stirring blades are concentrically arranged inside a cylindrical casing, and liquid is introduced to the outside of the stirring blades from an inflow port provided in front of the rotors by rotation of the stirring blades, characterized in that a plurality of stirring blades are projected from the outer peripheral portion of the disk-shaped rotor, a tubular stator having slits on the outside and the inside of each stirring blade is arranged, and a partition plate that divides the inside of the stator provided inside the stirring blade into a flow path and a chamber is formed, and a powder inflow port communicating with the chamber is provided in a casing", and "a powder suction and dissolution pump in which rotors provided with stirring blades are concentrically arranged inside a cylindrical casing, and liquid is introduced to the outside of the stirring blades from an inflow port provided in front of the rotors by rotation of the stirring blades, characterized in that each stirring blade is projected from the outer peripheral portion of the rotor, a tubular stator having a slit is disposed inside the stirring blade, and a partition plate that divides the inside of the stator into a liquid flow path and a chamber in the rotor, and a scraping blade for scraping out the powder introduced from the powder introduction port communicating with the chamber is arranged on the chamber side of the partition plate". The shape of the casing is preferably cylindrical, but other shapes may also be employed. The stirring blades and the rotor may be in any form as long as they can be accommodated in the above casing, and can rotate in the above casing to impart frictional energy and shear energy to the dispersion medium and the powders drawn into the casing. By mixing the powders together with the dispersion medium using the powder mixing pump 10, it is possible to supply the powders into the pump 10 by decompression suction, and it is also possible to efficiently disperse the powders in the dispersion medium while preventing excessive pulverization by cavitation and shearing in the pump 10.

1. 2. Powder Supply Device 20

The form of the powder supply device 20 is not particularly limited as long as it can supply powders into the system. For example, the forms in which the powders charged from an inlet (hopper) 20*a* are introduced into the system by dropping, extrusion, and the like may be chosen. As shown in FIG. 1, it is preferable that the powder supply device 20 be connected between the liquid feeding pump 40 and the powder mixing pump 10. This is because the powders can be more properly supplied into the system by the liquid feeding by the liquid feeding pump 40 and the suction by the powder mixing pump 10.

1. 3. Stirring Tank 30

The stirring tank 30 is not limited as long as it is provided with a stirring device 30*a* inside, and can stir dispersion media and powders. Specific examples of the stirring device 30*a* include, but are not limited to, a form in which stirring blades are rotated by a power as shown in FIG. 1. The stirring tank 30 has an inlet and an outlet for circulating a dispersion medium and the like in the system, and may further have another inlet and outlet separately from them. For example, as indicated by arrows on the left side of the sheet of FIG. 1, a supply port for supplying various liquids such as a dispersion medium into the stirring tank 30 or a discharge port for discharging the dispersion medium and the like out of the system may be provided.

1. 4. Liquid Feeding Pump 40

The liquid feeding pump 40 may be any pump that can control a flow of the dispersion medium and the like in the system. With the liquid feeding pump 40, the dispersion medium and the like can easily flow in one direction in the system. As shown in FIG. 1, it is preferable that the liquid feeding pump 40 be provided between the stirring tank 30 and the powder mixing pump 10 so as to feed the dispersion medium and the like discharged from the stirring tank 30 to the powder mixing pump 10.

In the mixing apparatus 100, a means for connecting the powder mixing pump 10, the powder supply device 20, the stirring tank 30, and the liquid feeding pump 40 is not particularly limited, and they may be connected through general piping. In this case, the pipes between the structures 10 to 40 may be provided with openable discharge ports. The arrangement of the structures 10 to 40 in the mixing apparatus 100 shown in FIG. 1 (facility alignment) is an example. The arrangement of the structures 10 to 40 in the mixing apparatus 100 is not limited to that shown in FIG. 1, and it may be any arrangement with which the dispersion medium and the like can circulate in the mixing apparatus 100.

2. Method of Manufacturing Active Material Mixture

The present inventors have encountered a problem that, when a solid electrolyte, an active material, and a conductive material are mixed together with a dispersion medium through a rotor provided with stirring blades as described above, the solid electrolyte in the mixture tends to aggregate, and it is difficult to reduce the particle size of the mixture. As a result of trial and error to solve the problem, the present inventors have found that, it is possible to suppress aggregation of the solid electrolyte and to remarkably reduce the particle size of the mixture, by dispersing the solid electrolyte in the dispersion medium while circulating the dispersion medium, and after that, supplying and dispersing the active materials and the conductive material therein.

On the other hand, the present inventors have encountered a new problem that the mixture may experience a large temperature increase when the solid electrolyte is dispersed in the dispersion medium while circulating the dispersion medium through a rotor, and after that the active material and the conductive material are supplied and dispersed therein, as described above. Through more detailed studies, the present inventors have found that the viscosity and solid content concentration of the slurry are low in the stage of supplying the solid electrolyte into the dispersion medium and the temperature of the slurry hardly increase even when the rotation speed of the rotor is high; on the other hand, the viscosity and solid content concentration of the slurry are high in the stage of supplying and dispersing the active material and the conductive material in the dispersion medium and the temperature of the slurry increases largely when the rotation speed of the rotor is high. In other words, it has been found that, in the stage of supplying and dispersing the active material and the conductive material, the increase in temperature of the mixture can be suppressed by lowering the rotation speed of the rotor.

Further, the present inventors have found that, even if the rotation speed of the rotor is lowered at the stage of supplying and dispersing the active material and the conductive material, aggregation of the solid electrolyte can be suppressed, and the particle size of the active material mixture finally obtained can be sufficiently reduced.

Figure 2:
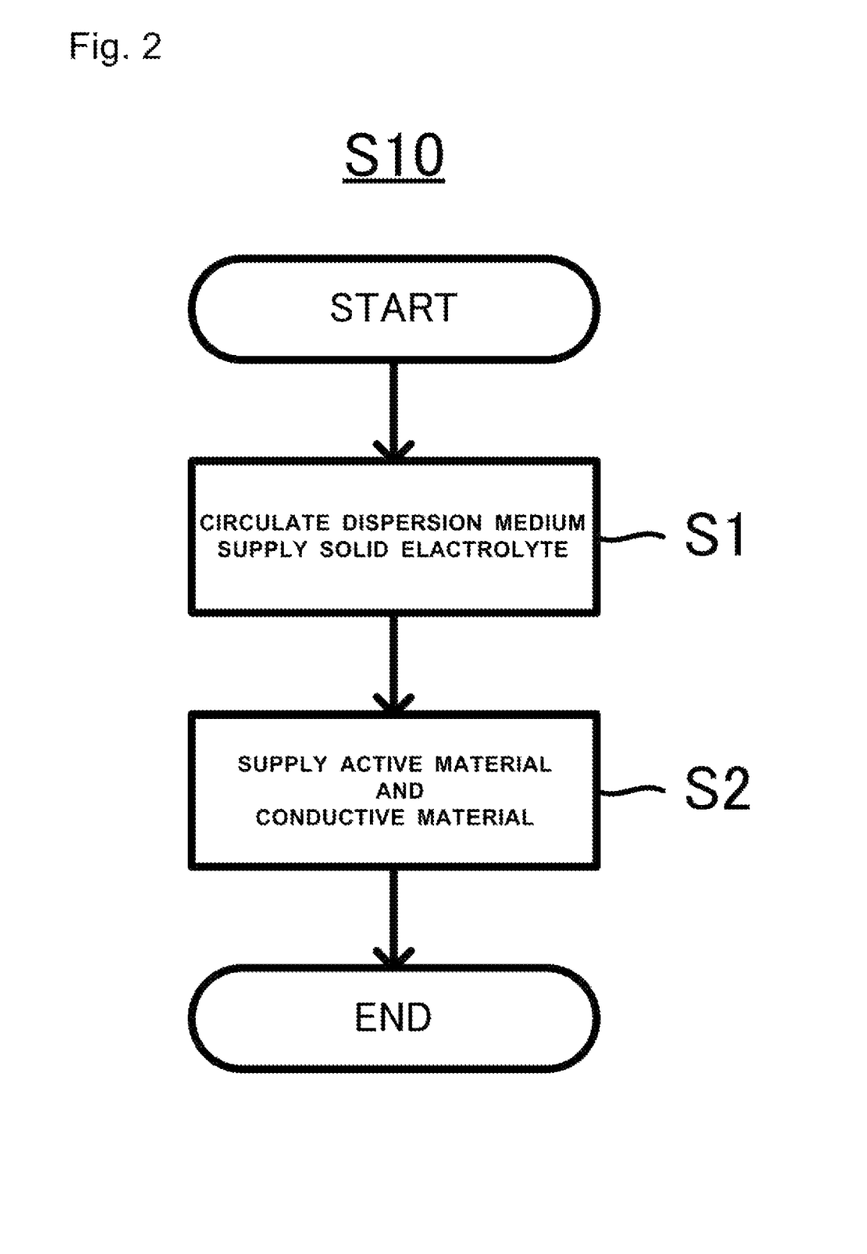
FIG. 2 is a chart to explain a flow of a manufacturing method S10 of an active material mixture.

FIG. 2 shows a flow of a manufacturing method S10 of an active material mixture of the present disclosure. As shown in FIG. 2, the manufacturing method S10 of an active material mixture of the present disclosure is a method for manufacturing an active material mixture by mixing powders and liquids while rotating a rotor provided with stirring blades, and includes a first dispersing step S1 of supplying and dispersing a solid electrolyte in a dispersion medium while circulating the dispersion medium, and a second dispersing step S2 of, after the first dispersing step S1, supplying and dispersing an active material and a conductive material in the dispersion medium in which the solid electrolyte is dispersed, while circulating the dispersion medium. Here, in the manufacturing method S10, the average rotation speed of the rotor in the second dispersion step S2 is set to be lower than the average rotation speed of the rotor in the first dispersion step S1.

2. 1. Circulation of Dispersion Medium

In the manufacturing method S10, the dispersion medium circulates through the rotor provided with stirring blades. For example, when the mixing apparatus 100 shown in FIG. 1 is used, the dispersion medium can be circulated into the system through the rotor provided in the powder mixing pump 10, by supplying the dispersion medium from a supply port or the like of the stirring tank 30 into the mixing apparatus 100 and operating at least the powder mixing pump 10 (preferably, the powder mixing pump 10, the stirring device 30a, and the liquid feeding pump 40). The volume and speed of flow of the dispersion medium are not particularly limited, and may be appropriately determined in consideration of productivity and the like.

The dispersion medium may be any medium that functions as a medium for dispersing a solid content described later. In particular, it is preferable that the dispersion medium contain a solvent and a binder. In this case, it is preferable that the binder be dissolved in the solvent, but it is not necessary that all of the binder is dissolved. It is also possible to use a dispersion medium in which the binder is swollen without dissolving in the solvent. The solvent constituting the dispersion medium preferably has as small reactivity to the solid electrolyte and the like as possible, and a nonaqueous solvent is preferred. As the nonaqueous solvent, a polar solvent, a nonpolar solvent, or a combination thereof can be used without any particular limitations. Examples of the nonpolar solvent include heptane, toluene, and xylene. Examples of the polar solvent include ethanol, N-methylpyrrolidone, butyl acetate, butyl butyrate, and the like. Only one kind of nonaqueous solvent may be used, or a mixture of two or more kinds thereof may also be used. On the other hand, any binders known as binders to be contained in active material mixtures can be employed. For example, at least one kind selected from styrene butadiene rubber (SBR), carboxy methylcellulose (CMC), acrylonitrile butadiene rubber (ABR), butadiene rubber (BR), polyvinylidene fluoride (PVdF), polytetrafluoroethylene (PTFE), polyimide (PI), and the like can be used. The content of the binder in the dispersion medium is not particularly limited. An additive such as a viscosity modifier (thickener) and a dispersant may be contained in the dispersion medium within a range in which the above problem can be solved.

2. 2. First Dispersion Step S1

In the first dispersion step S1, the solid electrolyte is supplied and dispersed in the dispersion medium while the dispersion medium is circulated through a rotor provided with stirring blades. For example, when the mixing apparatus 100 shown in FIG. 1 is used, the solid electrolyte is supplied from the powder supply device 20 to the dispersion medium and dispersed in the dispersion medium while the dispersion medium is circulated in the mixing apparatus 100, by activating at least the powder mixing pump 10.

As the solid electrolyte, any known solid electrolytes to form active material mixtures can be employed. However, the above-mentioned problem of aggregation is particularly likely to occur when sulfide solid electrolytes are used. That is, from the viewpoint that the effect from the manufacturing method S10 becomes more remarkable, it is preferable to employ a sulfide solid electrolyte as the solid electrolyte. As the sulfide solid electrolyte, for example, a solid electrolyte containing Li, P, and S as constituent elements can be used. Specific examples include $Li_2S$—$P_2S_5$, $Li_2S$—$SiS_2$, LiI—$Li_2S$—$SiS_2$, LiI—$Si_2S$—$P_2S_5$, LiI—LiBr—$Li_2S$—$P_2S_5$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, and $Li_2S$—$P_2S_5$—$GeS_2$. Among these, sulfide solid electrolytes including $Li_2S$—$P_2S_5$ are more preferable. Only one kind of solid electrolyte may be used alone, or a mixture of two or more kinds thereof may also be used. Although there is no particular limitation on the shape of the solid electrolyte, it is usually particulate in the shape before being supplied to the dispersion medium (a shape when being charged into the inlet 20a of the powder supply device 20). In this case, it is preferable that the particle diameter of the solid electrolyte before being supplied to the dispersion medium be 0.01 μm to 5 μm. The lower limit is more preferably no less than 0.05 μm, further preferably no less than 0.1 μm, and the upper limit is more preferably no more than 3 μm, and further preferably no more than 2 μm. Alternatively, the average particle diameter ($D_{50}$) of the solid electrolyte is preferably 0.01 μm to 5 μm. The lower limit is more preferably no less than 0.05 μm, further preferably no less than 0.1 μm, and the upper limit is more preferably no more than 3 μm, and further preferably no more than 2 μm. it is noted that the average particle diameter ($D_{50}$) in the present application refers to a median diameter (50% volume average particle diameter) derived from a particle size distribution measured based on a particle size distribution measuring device based on a laser scattering and diffraction method.

The average rotation speed of the rotor in the first dispersion step S1 is higher than the average rotation speed of the rotor in the second dispersion step S2. The shiny in the first dispersion step S1 (dispersion medium containing the solid electrolyte) is low in the solid content concentration and viscosity, and the temperature of the slurry hardly increase even if the rotation speed of the rotor is high. The rotation speed of the rotor may be appropriately determined according to the form of the active material mixture to be manufactured. For example, the peripheral speed of the rotor (the maximum peripheral speed of the stirring blades, the rotation speed of the tips of the stirring blades) may be 10 m/s to 36 m/s.

The supply rate of the solid electrolyte in the first dispersion step S1 is not particularly limited. In the first dispersion step S1, the solid electrolyte may be continuously or intermittently supplied into the dispersion medium.

In the first dispersion step S1, the supply amount of the solid electrolyte (the volume ratio of the solid electrolyte to the dispersion medium or the solid content concentration in the dispersion medium) is not particularly limited. The supply amount of the solid electrolyte may be adjusted from the viewpoint of further improving productivity and the like. In this regard, in the first dispersion step S1, it is preferable to adjust the supply amount of the solid electrolyte so that the amount of the solid electrolyte becomes 1% to 50% by volume, based on the total of the volumes of the dispersion medium and the solid electrolyte (100% by volume). The lower limit is more preferably no less than 5% by volume, further preferably no less than 10% by volume, and the upper limit is more preferably no more than 30% by volume, and further preferably no more than 20% by volume.

In the first dispersion step S1, the solid electrolyte may be supplied to the dispersion medium in a dry manner or may be supplied to the dispersion medium in a wet manner together with a solvent or the like.

2.3. Second Dispersion Step S2

In the second dispersion step S2, after the first dispersion step S1, the active material and the conductive material are supplied and dispersed in the dispersion medium in which the solid electrolyte is dispersed, while the dispersion medium circulates.

As the active material, any materials known as active materials to form active material mixtures can be employed. When the active material mixture is used as a cathode mixture, lithium-containing oxides and the like such as lithium cobalt oxide, lithium nickel oxide, Li(Ni, Mn, Co)O$_2$ (LiI$_{1+\alpha}$Ni$_{1/3}$Mn$_{1/3}$Co$_{1/3}$O$_2$), lithium manganese oxide, spinel-type lithium composite oxides, lithium titanium oxide, and lithium metal phosphates (LiMPO$_4$, M is at least one selected from Fe, Mn, Co, and Ni) can be employed as the active material. When the active material mixture is used as a anode mixture, silicon-based active materials such as Si, Si alloy, and silicon oxides, carbon-based active materials such as graphite and hard carbon, various oxide-based active materials such as lithium titanium oxide, and lithium-based active materials such as metallic lithium and lithium alloy, can be employed as the active material. Only one kind of active material may be used alone, or a mixture of two or more kinds thereof may also be used. The shape of the active material is not particularly limited, but is usually in a particulate form. In this case, the particle diameter of the active material before being supplied to the dispersion medium is preferably 0.01 μm to 50 μm. The lower limit, is more preferably no less than 0.5 μm, further preferably no less than 1 μm or more, and the upper limit is more preferably no more than 20 μm, and further preferably no more than 5 μm. Alternatively, the average particle diameter ($D_{50}$) of the active material is preferably 0.01 μm to 50 μm. The lower limit is more preferably no less than 0.5 μm, further preferably no less than 1 μm and the upper limit is more preferably no more than 20 μm, and further preferably no more than 5 μm.

As the conductive material, any known conductive materials to form active material mixtures can be employed. For example, carbon materials such as acetylene black, Ketjen black, VGCF, and carbon nanofibers, and metallic materials such as nickel, aluminum, and stainless steels can be employed. Only one kind of conductive material may be used alone, or a mixture of two or more kinds thereof may also be used. Although there is no particular limitation on the shape of the conductive material, it is preferably in a particulate form or a fibrous form. The particulate conductive material preferably has, for example, a primary particle diameter of 5 nm to 10 μm. The fibrous conductive material preferably has, for example, a fiber diameter of 10 nm to 1 μm and an aspect ratio of 20 or more.

The average rotation speed of the rotor in the second dispersion step S2 is lower than the average rotation speed of the rotor in the first dispersion step S1. The slurry in the second dispersion step S2 (dispersion medium containing the solid electrolyte, the active material, and the conductive material) is high in solid content concentration and viscosity, and the temperature of the slurry is likely to increase largely when the rotation speed of the rotor is high. The rotation speed of the rotor may be appropriately determined according to the form of the active material mixture to be manufactured. For example, the peripheral speed of the rotor (the maximum peripheral speed of the stirring blades, the rotation speed of the tips of the stirring blades) may be 5 m/s to 30 m/s.

In the second dispersion step S2, the solid content concentration becomes particularly high at the end stage of supply of the active material and the conductive material, and the problem of the above temperature increase is more likely to occur. In this regard, it is preferable to lower the rotation speed of the rotor at the end stage of supply of the active material and the conductive material. That is, when the second dispersion step S2 is divided into a first half and a second half, it is preferable that the average rotation speed of the rotor of the powder mixing pump 10 in the second half be lower than the average rotation speed of the rotor of the powder mixing pump 10 in the first half.

The supply rate of the active material and the conductive material in the second dispersion step S2 is not particularly limited. In the second dispersion step S2, the active material and the conductive material may be continuously or intermittently supplied into the dispersion medium. However, from the viewpoint of preventing operation failure due to powder clogging, improving the production rate, and the like, it is preferable that, when the second dispersion step S2 is divided into the first half and the second half, the average supply rate of the active material and the conductive material in the second half be lower than the average supply rate of the active material and the conductive material in the first half. Or, it is preferable to change the supply rate of the active material and the conductive material depending on the rotation speed of the rotor in the second dispersion step S2. Specifically, when the rotation speed of the rotor is lowered in the second dispersion step S2, it is preferable to also lower the supply rate of the active material and the conductive material.

In the second dispersion step S2, the supply amount of the active material and the conductive material (the volume ratio of the solid electrolyte, the active material, or the conductive material to the dispersion medium, and the solid content concentration in the dispersion medium) is not particularly limited, but the productivity and the like may be deteriorated either the amount of the active material and the conductive material is too small or too large. In this regard, in the second dispersion step S2, it is preferable to adjust the supply amount of the active material and the conductive material so that the total of the solid electrolyte, the active material, and the conductive material becomes 10% to 70% by volume, based on the sum of the volumes of the dispersion medium, the solid electrolyte, and the active material and the conductive material (100% by volume). The lower limit is more preferably no less than 20% by volume, further preferably no less than 30% by volume, and the upper limit is more preferably no more than 50% by volume, and further preferably no more than 40% by volume. It is noted that the blending ratio of the solid electrolyte, the active material, and the conductive material is not particularly limited, and may be appropriately adjusted according to the composition of the target active material mixture.

In the second dispersion step S2, the active material and the conductive material may be supplied to the dispersion medium in a dry manner, or may be supplied to the dispersion medium in a wet manner together with a solvent or the like.

As described above, in the manufacturing method S10, in mixing and dispersing the powders while circulating the dispersion medium in the system of a circulation type through the rotor provided with stirring blades, aggregation of the mixture can be suppressed and the particle size of the mixture can be reduced by dispersing the active material and the conductive material after dispersing the solid electrolyte. Further, at the stage of dispersing the active material and the conductive material, it is possible to regulate the temperature of the mixture while sufficiently reducing the particle size of the composite material by lowering the rotation speed of the rotor. The active material mixture obtained through the manufacturing method S10 is in the form of a slurry or paste, and can be applied to, for example, a coating process for manufacturing an electrode as it is.

3. Apparatus for Manufacturing Active Material Mixture

The technique of the present disclosure also has an aspect as an apparatus for manufacturing an active material mixture. That is, the manufacturing apparatus of the present disclosure is an apparatus for manufacturing an active material mixture by mixing powders and liquids while rotating a rotor provided with stirring blades, including: a first dispersion unit that supplies and disperse an active material in a dispersion medium while circulating the dispersion medium; and a second dispersion unit that supplies and disperse, after dispersion by the first dispersion unit, an active material and a conductive material in the dispersion medium in which the solid electrolyte is dispersed, while circulating the dispersion medium. Here, in the manufacturing apparatus of the present disclosure, the average rotation speed of the rotor in the second dispersion unit is lower than the average rotation speed of the rotor in the first dispersion unit. It is possible to employ the preferred forms described in the first dispersion step S1 and the second dispersion step S2 described above as preferred forms of the first dispersion unit and the second dispersion unit.

In the manufacturing apparatus of the present disclosure, the first dispersion unit and the second dispersion unit may be the same unit or different units. The manufacturing apparatus of the present disclosure preferably includes, for example, the above-described powder mixing pump 10, powder supply device 20, stirring tank 30, and liquid feeding pump 40. In this case, the powder mixing pump 10 may serve as both the first dispersion unit and the second dispersion unit.

4. Supplement

In the manufacturing method S10 of the present disclosure, one feature is that a rotor provided with stirring blades is used. However, from the viewpoint of further making it easy to circulate the dispersion medium, to supply and disperse the powders in the dispersion medium, and the like, it is preferable to use the powder mixing pump 10 provided with the above-described rotor as shown in FIG. 1, and it is more preferable to use the powder mixing pump 10 provided with the above-described rotor, the powder supply device 20, the stirring tank 30 having the stirring device 30a, and the liquid feeding pump 40.

In the manufacturing method S10 of the present disclosure, the "average" rotation speed of the rotor in the second dispersion step S2 is lower than the "average" rotation speed of the rotor in the first dispersion step S1. That is, the rotation speed of the rotor may be high in a part of the second dispersion step S2 (e.g., instantaneously exceeds the rotation speed of the rotor in the first dispersion step S1) as long as the average value of the rotation speed of the rotor through the entire second dispersion step S2 is lower than the average value of the rotation speed of the rotor in the first dispersion step S1. However, from the viewpoint of exhibiting more remarkable effects, it is preferable that the rotation speed of the rotor be lower throughout the second dispersion step S2 than the rotation speed of the rotor in the first dispersion step S1. The same applies to the average rotation speed of the rotor in the first dispersion unit and the second dispersion unit in the manufacturing apparatus of the present disclosure.

In the manufacturing method S10 of the present disclosure, the second dispersion step S2 is performed after the first dispersing step S1. Here, "after the first dispersion step" is preferably after all of the solid electrolyte to be supplied is supplied into the dispersion medium. However, the supply of the active material and the conductive material to the dispersion medium may be started before the supply of the solid electrolyte to the dispersion medium is completed within the range in which the above problem can be solved. In this case, at the time when the supply of the active material and the conductive material is started, the first dispersion step is regarded as completed and the second dispersion step is regarded as started. The same applies to the first dispersion unit and the second dispersion unit in the manufacturing apparatus of the present disclosure.

EXAMPLES

1. Making of Mixing Apparatus (Manufacturing Apparatus)

A mixing apparatus was made including the above-described powder mixing pump 10, powder supply device 20, stirring tank 30, and liquid feeding pump 40 in an arrangement as shown in FIG. 1.

2. Consideration of Order of Powder Loading 2.1. Comparative Example

The mixing apparatus was operated to circulate a dispersion medium through a powder mixing pump, in which a solvent (butyl butyrate) and a binder (PVDF) were used as the dispersion medium. Subsequently, in a state in which the mixing apparatus was being operated, a solid electrolyte (main component: Li$_2$S—P$_2$S, particle size: about 0.2 μm to 2 μm) an active material (NCM for a cathode and C, SI or Li$_3$TiO for a anode, particle size: about 1 μm to 5 μm), and a conductive material (VGCF, fibrous size: about 150 nm, fiber length 3 μm to 20 μm) were collectively supplied from the powder feeding device into the dispersion medium, and the solid electrolyte, the active material, and the conductive material were dispersed in the dispersion medium, to obtain an active material mixture in slurry form (solid content concentration: 37% by volume). The operation time after the supply of the solid electrolyte etc. was 20 minutes, and the peripheral speed of the rotor inside the powder mixing pump was 36 m/s.

2.2. Reference Example

The mixing apparatus was operated to circulate a dispersion medium through a powder mixing pump, in which a solvent (same as above) and a binder (same as above) were used as the dispersion medium. Thereafter, in a state in which the mixing apparatus was being operated, a solid electrolyte (same as above) was supplied from the powder supply device into the dispersion medium, and a first dispersion treatment was performed. In a state in which the mixing apparatus was remain operated, an active material (same as above) and a conductive material (same as above) were supplied from the powder supply device into the dispersion medium, and a second dispersion treatment was performed, and the solid electrolyte, the active material, and the conductive material were dispersed in the dispersion medium, to obtain an active material mixture in slurry form (solid content concentration: 39.7% by volume). The operation time after the supply of the solid electrolyte was 10 minutes, and the operation time after the supply of the active material and the conductive material was 10 minutes. The peripheral speed of the rotor inside the powder mixing pump was set to 36 m/s for both after the supply of the solid electrolyte and after the supply of the active material and the conductive material.

2.3. Measurement of Particle Size of Active Material Mixture

Figure 3:
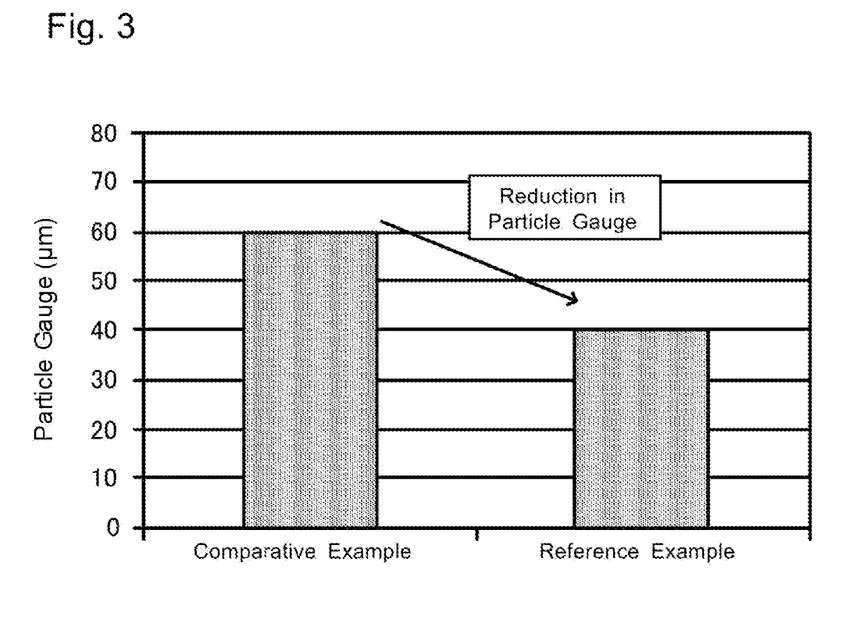
FIG. 3 is a graph to show particle gauges of the active material mixtures according to Comparative Example and Reference Example.

For each of Comparative Example and Reference Example, the particle size of the active material mixture in slurry form was measured according to JIS K5400-1990 by a particle size distribution measuring instrument (grind gauge) (the slurry was stretched, and the number of the portion where no less than 4 particles or no less than 3 streaks were generated was defined as the particle gauge value. Specifically, a scale was read at a position where three or more of lines, which were continuously 10 mm or more, appeared side by side for one groove. When the values of the two grooves were different, the scale having larger value was read). The results are shown in FIG. 3. As is apparent from the results shown in FIG. 3, in the mixing apparatus of a circulation type provided with a powder mixing pump, it was found that the particle size of the active material mixture finally obtained, the size being reached in the particle gauge, is greatly reduced by dividing the powders into: the solid electrolyte; and the active material and the conductive material, and mixing them in this order.

2.4. Confirmation of Increase in Temperature of Active Material Mixture

In both of Comparative Example and Reference Example, the temperature of the active material mixture increased to 55° C. or more. Since the active material mixture is preferably controlled at a temperature of no more than 40° C. due to its properties, it is considered that a cooling device is separately required in the methods according to Comparative Example and Reference Example.

3. Consideration of Rotation Speed of Rotor

A method that can sufficiently suppress an increase in temperature of the active material mixture while sufficiently reducing the particle size of the active material mixture was further considered. As a large cause of the increase in temperature of the active material mixture, there may be raised a mechanical energy imparted to the mixture by the rotation of the rotor and the stirring blades in the powder mixing pump. That is, it is considered that the lower the rotation speed of the rotor, the more temperature increase of the mixture is suppressed. However, when the rotation speed of the rotor is low, there is a concern that the particle size of the mixture remains being large. In order to check this point, the rotation speed of the rotor was considered.

3.1. Example

An active material mixture in slurry form (solid content concentration: 39.7% by volume) was obtained in the same manner as in Reference Example, except that the peripheral speed of the rotor inside the powder mixing pump in the second dispersion treatment was changed to 18 m/s.

3.2. Particle Size Measurement of Active Material Mixture

Figure 4:
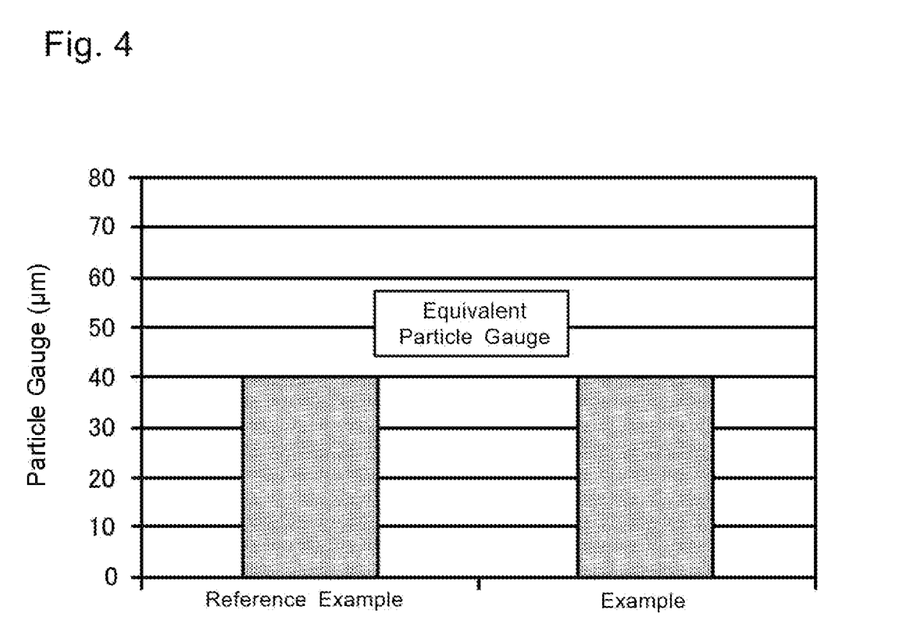
FIG. 4 is a graph to show particle gauges of the active material mixtures according to Reference Example and Example.

For the slurry according to Example, the particle size of the active material mixture was measured by the same procedure as described above. The results are shown in FIG. 4. As is apparent from the results shown in FIG. 4, the active material mixture according to Example had a particle size equivalent to that of the active material mixture according to Reference Example, even though the rotation speed of the rotor in the second dispersion treatment was low.

3.3. Checking of Increase in Temperature of Active Material Mixture

The temperature of the active material mixture according to Example increased only to about 18° C., and the temperature of the active material was able to remain being within the range of the control temperature even though a cooling device was not separately prepared.

From the above, it can be said that the following means are effective to sufficiently suppress an increase in temperature of the active material mixture while sufficiently reducing the particle size of the active material mixture.

(1) A solid electrolyte is supplied and dispersed in the dispersion medium while the dispersion medium is circulated through a rotor provided with stirring blades (first dispersion step), and thereafter, an active material and a conductive material are supplied and dispersed in the dispersion medium while the dispersion medium in which the solid electrolyte is dispersed is circulated (second dispersion step).

(2) The average rotation speed of the rotor in the second dispersion step is set lower than the average rotation speed of the rotor in the first dispersion step.

In particular, it is possible to further suppress increase in temperature of the active material mixture, by further lowering the average rotation speed of the rotor in the second half of the second dispersion step in which the slurry has the highest viscosity and solid content concentration. In other words, (3) When dividing the second dispersion step into a first half and a second half, it is preferable that the average rotation speed of the rotor in the second half be lower than the average rotation speed of the rotor in the first half.

4. Checking of the Characteristics of Powder Mixing Pump

Figure 5:
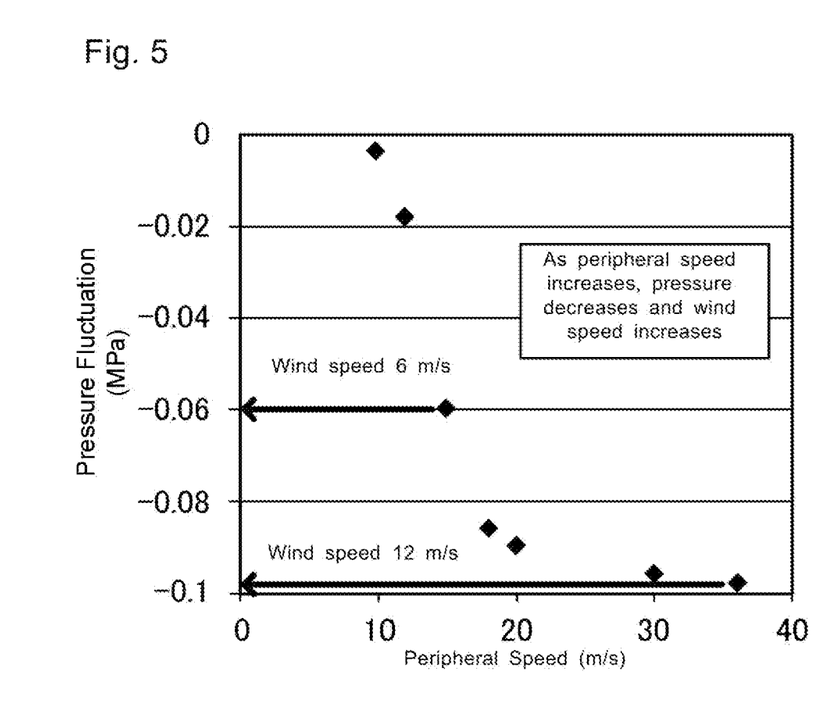
FIG. 5 is a graph to show the relationship between the rotor peripheral speed and the pressure fluctuation in a powder mixing pump.

By changing the peripheral speed of the rotor of the powder mixing pump, the relationship between the peripheral speed of the rotor and the pressure fluctuation (suction air volume by decompression) was checked. The results are shown in FIG. 5. As shown in FIG. 5, the suction air volume generated when the peripheral speed of the rotor was 18 m/s was substantially half of the suction air volume generated when the peripheral speed of the rotor was 36 m/s. That is, when the peripheral speed of the rotor is lowered, there is a concern of powder clogging caused by the decrease in the suction air volume even though the temperature increase of the active material mixture can be suppressed as described above. In this regard, in order to avoid the powder clogging, it is considered that reducing the powder supply rate in the second half of the second dispersion step is particularly effective. That is, (4) When the second dispersion step is divided into a first half and a second half, it is preferable that the average supply rate of the active material and the conductive material in the second half be lower than the average supply rate of the active material and the conductive material in the first half.

Figure 6:
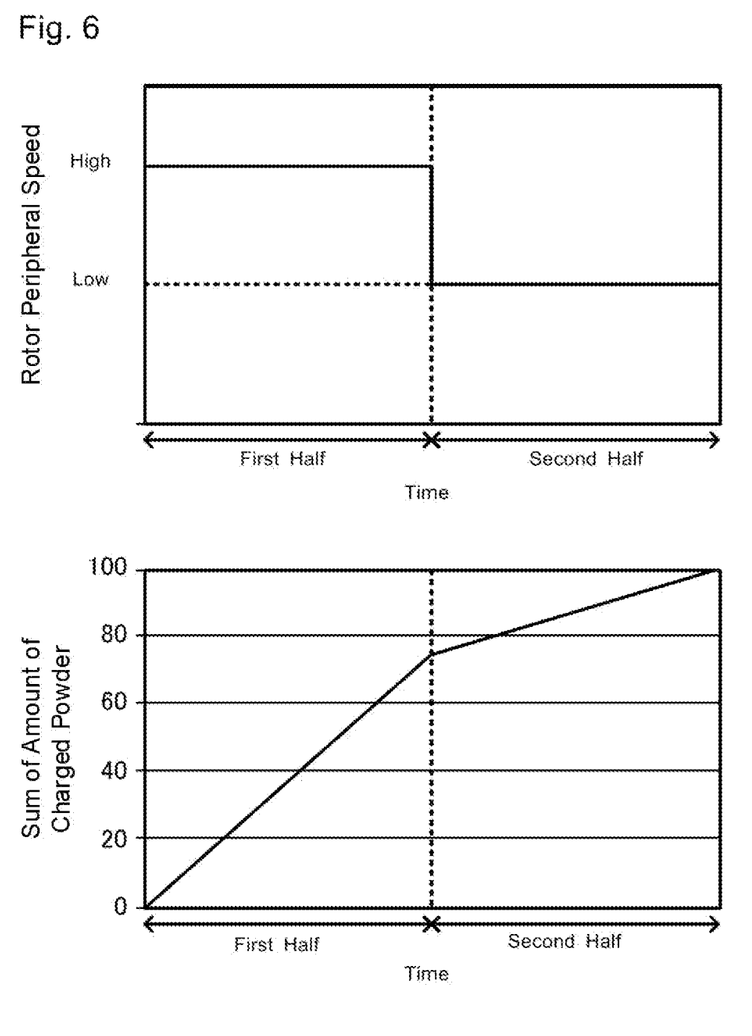
FIG. 6 includes graphs to explain an example of preferred conditions in a second dispersion step.

In order to suppress the temperature increase of the active material mixture, avoid powder clogging, and not to reduce the powder supply property (making the total powder supply time the same), it is considered that changing the supply rate of the active material and the conductive material according to the rotation speed of the rotor in the second dispersion step is effective. Specifically, when the rotation speed of the rotor is lowered in the second dispersion step, the supply rate of the active material and the conductive material may also be lowered. For example, as shown in FIG. 6, when the second dispersion step is divided into a first half and a second half, it is preferable that the average rotation speed of the rotor in the second half be lower than that in the first half and at the same time the average supply rate of the active material and the conductive material be lower than that in the first half.

In the above embodiment, an example is described in which the first dispersion step S1 and the second dispersion step S2 are performed by the same mixing apparatus 100 (mixing unit), but these steps may be performed by separate mixing apparatuses (mixing units).

INDUSTRIAL APPLICABILITY

The active material mixture manufactured by the manufacturing method of the present disclosure can be suitably used, for example, as a cathode mixture or a anode mixture of solid batteries. Solid batteries can be widely and suitably used from as small power sources for portable devices, etc. to as large power sources for vehicle-mounted, etc.

REFERENCES SIGNS LIST

10 powder mixing pump
20 powder supply device
30 stirring tank
40 liquid feeding pump
100 mixing apparatus (manufacturing apparatus)

The invention claimed is:

1. A method for manufacturing an active material mixture by mixing powders and liquids while rotating a rotor provided with stirring blades, the method comprising:
 a first dispersion step of supplying and dispersing a solid electrolyte in a dispersion medium while circulating the dispersion medium; and
 a second dispersion step of, after the first dispersion step, supplying and dispersing an active material and a conductive material in the dispersion medium in which the solid electrolyte is dispersed, while circulating the dispersion medium,
 wherein an average rotation speed of the rotor in the second dispersion step is lower than an average rotation speed of the rotor in the first dispersion step.

2. The method according to claim 1, wherein when the second dispersion step is divided into a first half and a second half, an average rotation speed of the rotor in the second half is lower than an average rotation speed of the rotor in the first half.

3. The method according to claim 1, wherein when the second dispersion step is divided into the first half and the second half, an average supply rate of the active material and the conductive material in the second half is lower than an average supply rate of the active material and the conductive material in the first half.

4. The method according to claim 1, wherein a powder mixing pump provided with the rotor is used.

5. The method according to claim 1, wherein a powder mixing pump provided with the rotor, a powder supply device, a stirring tank having a stirring device, and a liquid feeding pump are used.

6. An apparatus for manufacturing an active material mixture by mixing powders and liquids while rotating a rotor provided with stirring blades, the apparatus comprising:
 a first dispersion unit that supplies and disperse a solid electrolyte in a dispersion medium while circulating the dispersion medium; and
 a second dispersion unit that supplies and disperse, after dispersion by the first dispersion unit, an active material and a conductive material in the dispersion medium in which the solid electrolyte is dispersed, while circulating the dispersion medium,
 wherein an average rotation speed of the rotor in the second dispersion unit is lower than an average rotation speed of the rotor in the first dispersion unit.

* * * * *